United States Patent [19]
Wright

[11] 3,964,177
[45] June 22, 1976

[54] REINFORCING TEACHING SYSTEM

[76] Inventor: Thomas J. Wright, 630 Country Club Drive, Itasca, Ill. 60143

[22] Filed: Nov. 1, 1974

[21] Appl. No.: 519,817

[52] U.S. Cl. .................................................. 35/9 C
[51] Int. Cl.² ........................................... G09B 7/06
[58] Field of Search ............ 35/9 R, 9 A, 9 B, 9 C, 35/9 E, 19 A, 30 R, 48 R

[56] References Cited
UNITED STATES PATENTS

| | | | |
|---|---|---|---|
| 3,070,904 | 1/1963 | Saba | 35/9 C |
| 3,154,862 | 11/1964 | Culpepper, Jr. | 35/9 R |
| 3,363,330 | 1/1968 | Kobler | 35/9 C |
| 3,645,013 | 2/1972 | Takeuchi | 35/9 C |
| 3,824,706 | 7/1974 | Scopa et al. | 35/9 C |

Primary Examiner—Richard J. Apley
Assistant Examiner—Vance Y. Hum
Attorney, Agent, or Firm—Wagner & Aubel

[57] ABSTRACT

A self-teaching device which visually indicates the desired response to data presented. In the event an erroneous response is entered into the system, all prior responses are erased, requiring a complete repetition of the previous responses, thereby, reinforcing the correct response. A scrambler insures against patterned responses to the data presented.

9 Claims, 5 Drawing Figures

REINFORCING TEACHING SYSTEM

BACKGROUND OF THE INVENTION

This invention relates in general to group education systems and, in particular, to a self-study educational communication system whereby a student may respond to data presented at an individual rate of progress and repeat the program in accordance with individual needs. The system may be modified to meet individual educational system parameters through programming the correct response pattern to obtain the objective and functional requirements of the educational system.

More specifically, this invention relates to a teaching device which utilizes repetitive or reinforcing teaching techniques. The correct responses to predetermined data or information are indicated visually to stimulate interest retention and require the coordination of the students' mental and motor skills. The correct responses may be programmed to prevent patterned response based solely on the physical positional relationship of the data presented and the responses.

In the field of education, student enrollment within our institutions of higher learning has nearly tripled in the last twenty years, and it is predicted to increase one and one-half times in the next decade. This increase in enrollment has necessitated educational institutions to utilize large classes where the student-to-teacher ratio becomes magnified to such an extent that communication from the student to the teacher becomes stifled. The flow of information between the instructor and student in this environment is perhaps only fair, and the amount of feedback from the student to the instructor is usually very poor.

In addition to the poor educational communication between the student and the instructor, such an educational system must transmit information to a student at a rate based upon the evaluation made by the instructor as to the capabilities of the largest number of students. Therefore, certain students who have the capabilities of progressing and assimilating information at a much more rapid rate are precluded from obtaining this information in accordance with their comprehension ability. These students find that the subject matter does not present an intellectual challenge, thereby reducing their incentive and leading to boredom. Other students in the same large classroom are unable to comprehend the subject matter as rapidly as the instructor presents it to them, thereby frustrating the students, destroying their initiative, causing them to lose self-confidence in their learning ability and to intellectually withdraw from the information being transmitted by the instructor.

In view of the problems associated with the traditional large classroom type of education, many attempts have been made to provide independent study environment to enable a student to obtain the educational data from an instructor or other source of information on an individual basis. Programmed teaching has been developed in an attempt to overcome these problems. However, such individual independent study systems have been extremely costly. Even though these systems have been very successful in achieving these objectives, their high cost in view of the many constraints on school budgets has made their installation prohibitive.

In addition to the high cost of the systems each of the systems has been designed to meet the particular requirements of the educational system and may not be modified without extensive and costly changes. In view of the rapid and frequently changing concepts in education today, these inflexible programmed teaching systems have been unsatisfactory. In order to meet the system demands of educators and to enable them to modify any educational program to meet their unique requirements within the limited constraints of educational bedgeting, it becomes necessary that the educational communication system equipment which they utilize be adaptable to satisfy their various educational programs.

SUMMARY OF THE INVENTION

It is, therefore, an object of this invention to improve the educational process.

Another object of this invention is to allow educational communication to proceed at a rate determined by an individual student's ability to comprehend the data presented to him.

A further object of this invention is to permit the student to individually study the educational programs presented and respond to the data presented.

Still another object of this invention is to provide an efficient and inexpensive system for presenting a predetermined educational program to a student for individual study.

These and other objects are attained in accordance with the present invention wherein there is provided a self-teaching device which visually indicates the correct response to predetermined data presented, thereby stimulating and retaining the student's interest. In the event an erroneous response is entered into the system, all prior responses are erased, requiring a complete repetition of the previous responses, thereby reinforcing the correct answers. A scrambler insures against patterned responses to the data presented.

DESCRIPTION OF THE DRAWINGS

Further objects of the invention, together with additional features contributing thereto and advantages accruing therefrom, will be apparent from the following description of one embodiment of the invention when read in conjunction with the accompanying drawings, wherein.

DESCRIPTION OF A PREFERRED EMBODIMENT

Figure 1:
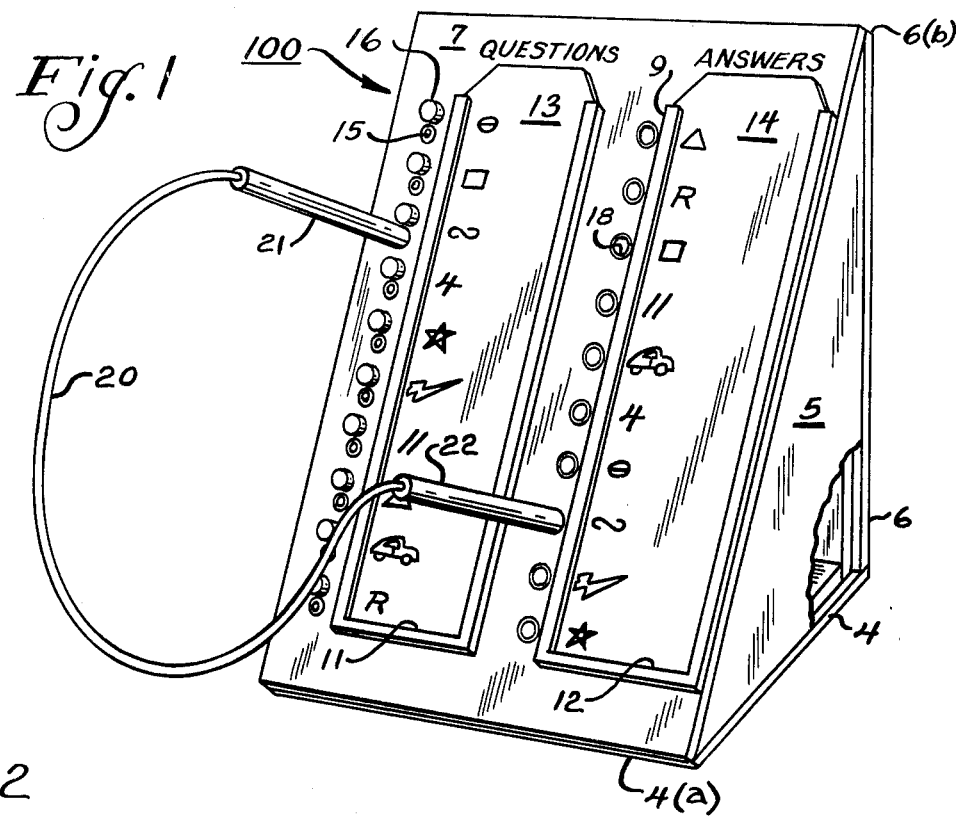
FIG. 1 is a frontal perspective view of the teaching device.
Figure 2:
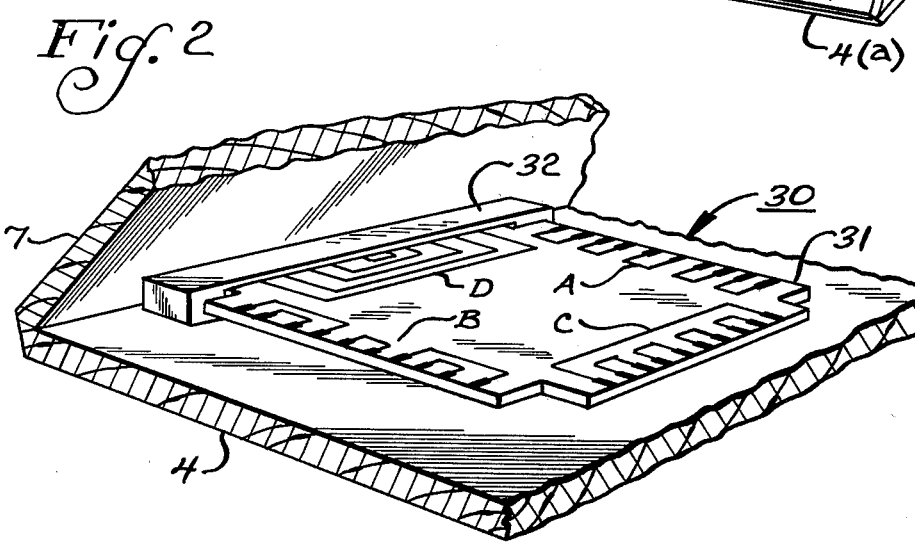
FIG. 2 is a frontal perspective view of the printed circuit board scrambler connected into the electrical circuit of the device.

Referring now to FIG. 1, there is shown the teaching apparatus 100 comprising a base 4, triangular shaped side panels 5, back panel 6, and a front panel 7. The front panel or face 7 is joined to the uppermost portion (6a) of the back panel 6 at one end and the forward edge (4a) of the base 4 at the other end to form an enclosure for the electrical circuitry with the front panel 7 being inclined to facilitate usage by the student. The front panel 7 has a pair of U-shaped channels 9 secured thereto forming pockets 11 and 12 for the insertion of interchangeable data bearing cards 13 and 14 which have preprinted indicia corresponding to the data presented and responses, respectively.

A series of sockets or terminals 15 and corresponding indicator lamps 16 operatively connected thereto are carried by the front panel 7 at predetermined points along the channel formed pocket 11 which carries the data card 13. Each of the terminals 15 is carried by the panel 7 at a position adjacent the indicia on the data card 13 such that a student will associate one terminal as corresponding to the question or data selected.

The cards 13 and 14 function to present data, for example, questions and responses, such as answers, respectively, and may convey this information, for example, by means of character association as shown, or printed questions and answers, or combinations thereof. The cards 13 and 14 are carried within the pockets 11 and 12, respectively, with the information carried thereon being positioned adjacent the respective terminals or sockets 15 and 18 so that a student will associate the terminals adjacent each of the questions with each data inquiry, and the indicia on the response card with each corresponding terminal adjacent a selected response or answer. Individual inquiry data and response cards may be removed from the pockets 11 and/or 12, and replaced with others.

Figure 3:
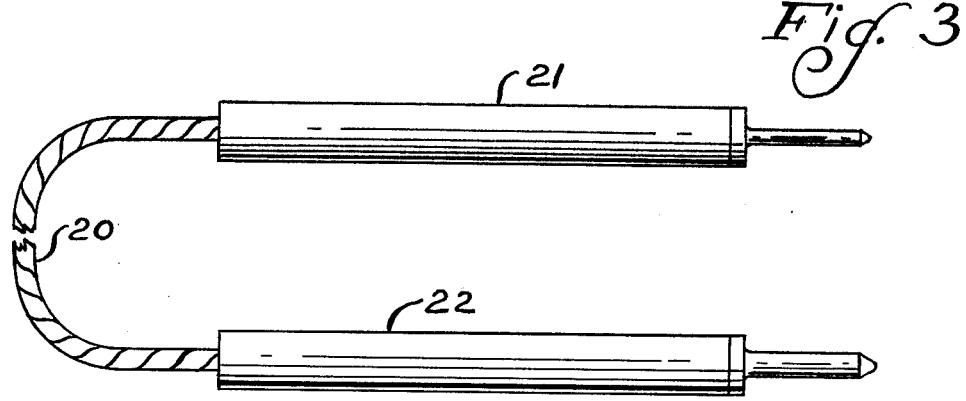
FIG. 3 is a perspective view of the probes used to physically and electrically couple the selected responses to the data presented.

As best shown in FIG. 3, a response, selected to correspond to a question, is indicated by inserting the pair of probes or jacks 21 and 22 which correspond to the inquiry data presented and selected response, respectively, into the correct one of the sockets 15 and 18. The two probes are connected one with the other by means of an insulated conductive cable 20 to form an electric circuit upon the insertion of the probe 21 into a terminal or socket 15 of the inquiry data series and the probe 22 into a terminal or socket 18 of the response series. The portion of the probe 21 which is inserted into the socket 15 of the inquiry series is smaller than the portion 22 of the probe which is used for insertion into the socket or terminal 18 of the response series. In this manner the electrical control circuit can only be completed by proper electrically coupling of an inquiry and a response into the electrical circuitry associated with the teaching device. The openings in the receptacle portion of the sockets 15 and 18 are of a size corresponding to the respective probes 21 and 22.

Figure 5:
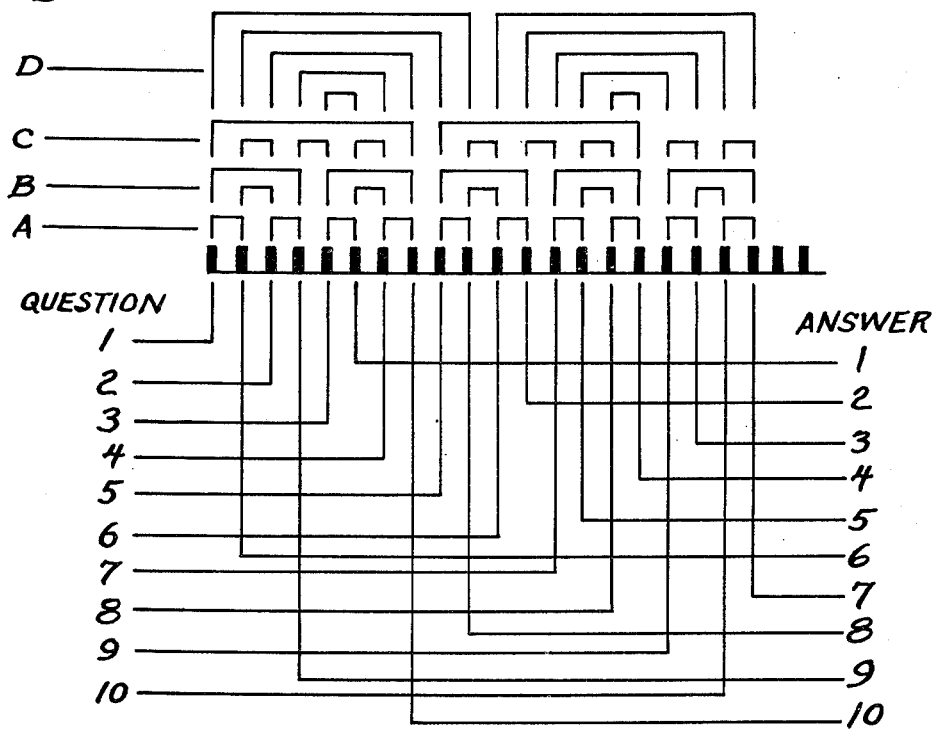
FIG. 5 is an electrical representation of the correct response table of the printed circuit board answer scrambler.

As heretofore disclosed, the individual cards may be removed from the pockets 11 and/or 12 to vary the material presented to the student. In addition, an answer or response scrambler 30 is provided such that four different response series may be used for the same inquiry data or to vary the response pattern between various sets of inquiry data or questions to preclude a student from associating the interconnection of terminals 15 and 18 by memorizing the coupling pattern of the terminal pairs. To accomplish this scrambling of the responses a printed circuit card 31 is provided having four patterns etched thereon enumerated by reference letters A, B, C, and D. In this manner, the question and answer series can be changed to any of the four patterns as shown by the correct response table of FIG. 5. The printed circuit board 31 is plugged in to a standard commercially available circuit board connector 32 to form a portion of the circuit to enable the indicator lamps 16 upon the coupling of correct responses. The response cards must be provided with a suitable code of A, B, C, or D to correlate the response pattern with the electrical circuitry. The response or answer pattern may be scrambled by merely removing the back panel 6 and repositioning the printed circuit card 31 in its connector 32 by inserting one of the other three sides in the connector.

Figure 4:
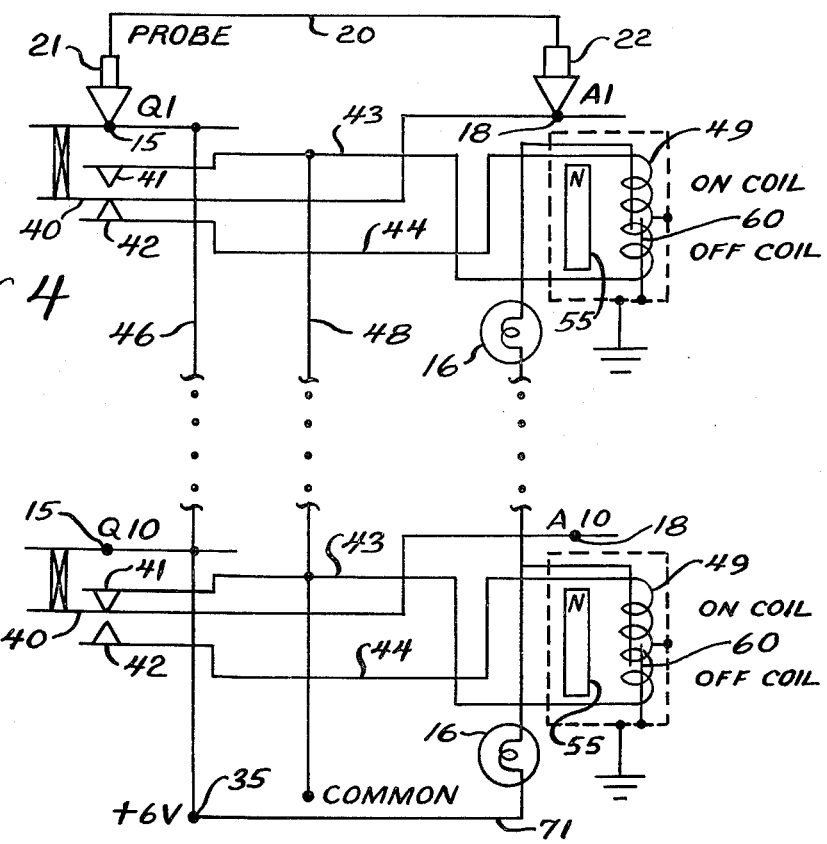
FIG. 4 is an electrical schematic of the probe and switching apparatus whereby correct responses to selected data are indicated on the device and, in the event an erroneous response is entered, all prior correct responses are erased.

Referring now to FIG. 4, there is shown the electrical circuitry of the teaching device which, for purposes of illustration, shows the circuitry for two of the question-answer or inquiry-response pairs with all other pairs not shown being electrically connected to the circuit in a similar manner. Upon entry of the correct answer to a selected question, a correct response is indicated by illuminating the indicator lamp 16 associated with the selected question. In the event an erroneous answer to coupled to a selected question, all lamps indicating previously correctly answered questions will be extinguished.

When, as shown, the question probe 21 is inserted into the terminal 15 of a selected question, the switch arm 40, which is normally spring-biased into contact with upper terminal 41 of the single pole double throw switch, is moved into contact with the lower terminal 42. The insertion of the answer probe 22 into any terminal 18 of the answer series completes an electrical circuit. If the answer probe 22 is inserted into the correct answer terminal 18 which corresponds to the selected question, an electrical circuit is established from a voltage source 35, through line 46 (common to all question terminals 15), through the switch arm 40 and lower contact 42 of the single pole, double throw switch. Closing of the switch arm 40 into contact with the lower terminal 42 causes current to be conducted through the lead 44 to energize coil 49 which closes the contacts of the reed switch 60. When the reed switch is closed, power is supplied to the indicator lamp 16 (which is coupled to the voltage source 35 through line 71 common to all indicator lamps 16) causing the lamp to be illuminated indicating that a correct answer has been made to the selected question. A permanent magnet 55 is positioned adjacent each of the reed switches 60 to expose the switches to a magnetic flux field from the magnet. The magnetic flux field of the permanent magent is insufficient to effect closure of the reed switch. However, when current flows through line 44 the magnetic field generated by the coil 49 produces a flux field which aids the flux field produced by the permanent magnet 55 and effects closing of the reed switch 60. When the probe is removed from the terminal to select another question and the answer corresponding thereto, the reed switch 60 will stay closed due to the hysterisis effect in the reed switch.

In the event the answer probe 22 is inserted into an answer terminal 18 which is not the correct answer to the question selected, for example A 10, the insertion of the question probe 21 into the terminal 15 of the question series (Q1) again moves the switch arm 40 from its normally biased contact with upper terminal 41 into contact with lower terminal 42. However, since the answer probe 22 would not be coupled to the appropriate terminal 18 corresponding to the correct answer (A1) to the question, the circuit previously discussed with reference to a correct answer would not be established and current would not flow through the lower switch contact 42 and lead 44 to energize the coil 49 associated with question Q1. Therefore, the indicator lamp corresponding to that question will not be illuminated. Since the answer probe 22 would be inserted into a terminal 18 which does not correspond to a correct answer, the electrical circuit which would be established is from the voltage supply 35 through the common line 46 (which is coupled to all of the terminals 15 corresponding to selected questions), through the switch arm 40 and upper switch contacts 41 and through common line 48 which would create a reverse flow of current through the coil 49 thereby opening all of the previously closed reed switches 60 extinguishing all of the indicator lamps 16 which had been previously illuminated by entry of the correct answers corresponding to the questions selected. Since the entry of an erroneous answer to any of the selected questions will result in the extinguishing of all indicator lamps which had been previously illuminated by correctly answered questions, a student must repeatedly answer all questions until the correct response to each question can be entered without the occurrence of any error. The repeated answering of the questions presented until all of the questions can be answered without any error reinforces the information conveyed and through this repetitive reinforcement ensures the learning process.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best motive contemplated for carrying out this invention, but that the invention will include all embodiments falling within the scope of the appended claims.

What is claimed is:

1. A teaching device for presenting a series of inquiry data and a corresponding number of responses comprising:

first display means for presenting a series of inquiry data, each of said inquiry data having an electrical terminal corresponding thereto, second display means for presenting a series of responses to the data presented, each of said responses having an electrical terminal corresponding thereto, probe means for electrically coupling the terminal corresponding to one of said inquiry data to one of the terminals corresponding to the selected response, and an electrical control circuit means coupled to said terminals including indicator means corresponding to each inquiry data for providing a constantly activated signal to said indicator means in response to the coupling of the electrical terminal corresponding to the correct response to the electrical terminal corresponding to the selected data, said electrical circuit means further including scrambler means for electrically changing the terminal corresponding to a correct response to the selected inquiry data to present at least a second series of responses corresponding to the inquiry data presented by said first display means and means for terminating all signals produced by the coupling of terminals corresponding to correct responses to terminals corresponding to selected data upon the coupling of an electrical terminal corresponding to an incorrect response to the electrical terminal corresponding to a selected inquiry data.

2. The apparatus of claim 1 wherein said first and second display means include means for carrying interchangeable indicia bearing data cards for changing the inquiry data and responses presented.

3. The apparatus of claim 1 wherein said scrambler means comprises a printed circuit board bearing a plurality of electrically conductive patterns thereon for electrically changing the terminals corresponding to correct responses to selected inquiry data.

4. The apparatus of claim 1 wherein said means for electrically coupling the terminal corresponding to a selected response to the terminal corresponding to one of the inquiry data comprises a pair of jacks insertable into said terminals and electrically coupled together by means of an insulated conductor.

5. The apparatus of claim 4 wherein the diameter of the portion of said jacks insertable into said terminals is different one from the other.

6. The apparatus of claim 1 wherein the electrical terminals corresponding to each of said inquiry data comprises a female receptacle of a first diameter and the electrical terminals corresponding to each of said responses comprises a female receptacle of a diameter different from that of the receptacles corresponding to the inquiry data.

7. The apparatus of claim 1 wherein said indicator means for providing a constant signal in response to the coupling of the electrical terminal associated with the correct response corresponding to the electrical terminal corresponding to a selected inquiry data comprises a lamp.

8. The apparatus of claim 7 wherein said electrical control circuit means further includes a magnetic reed switch operatively connected with each terminal such that the insertion of the jack into the terminal effects the completion of the electrical circuit.

9. The apparatus of claim 8 wherein said electrical control circuit means includes coils operatively connected with each of said terminals and energizable upon replacement of the jacks into a terminal corresponding to a selected inquiry data and into a terminal corresponding to an incorrect response to thereby open the electrical control circuit terminating all signals produced by said indicator means.

* * * * *